United States Patent [19]
Kilayko

[11] 3,817,264
[45] June 18, 1974

[54] VALVE

[75] Inventor: Enrique L. Kilayko, Auburndale, Mass.

[73] Assignee: Precision Control Products Corporation, Waltham, Mass.

[22] Filed: Feb. 14, 1973

[21] Appl. No.: 332,346

[52] U.S. Cl............... 137/111, 92/97, 92/101, 251/61.3
[51] Int. Cl. ........................................ G05d 11/03
[58] Field of Search ........ 137/87, 98, 99, 114, 111; 222/57; 210/101; 92/97, 101; 251/61.2, 61.3, 61.4, 61.5

[56] References Cited
UNITED STATES PATENTS

| | | | |
|---|---|---|---|
| 1,473,303 | 11/1923 | Lightford | 137/98 X |
| 1,921,551 | 8/1933 | Temple | 251/61.3 |
| 2,416,161 | 2/1947 | Deck | 137/87 X |
| 2,683,580 | 7/1954 | Griswold | 137/114 X |
| 3,076,477 | 2/1963 | Brandenberg | 92/101 X |
| 3,187,764 | 6/1965 | Arenhold | 137/114 |
| 3,218,824 | 11/1965 | Nelson | 92/101 X |

FOREIGN PATENTS OR APPLICATIONS

| | | | |
|---|---|---|---|
| 1,093,901 | 11/1954 | France | 251/61.2 |

*Primary Examiner*—Robert G. Nilson

[57] ABSTRACT

A valve for passing a first fluid in response to the pressure of a second fluid comprising a body having first fluid inlet and outlet ports connected by an internal fluid passage, a second fluid inlet port, and first and second internal chambers; a first flexible diaphragm mounted on the body and dividing the first chamber into separate first and second portions, the former portion communicating with the second fluid inlet port; a second flexible diaphragm mounted in the second chamber; a movable rigid connector extending between the diaphragms; and passage sealing means in the internal fluid passage including structure disposed to engage the second diaphragm, whereby movement of that diaphragm is operative to seal the passage.

1 Claim, 2 Drawing Figures

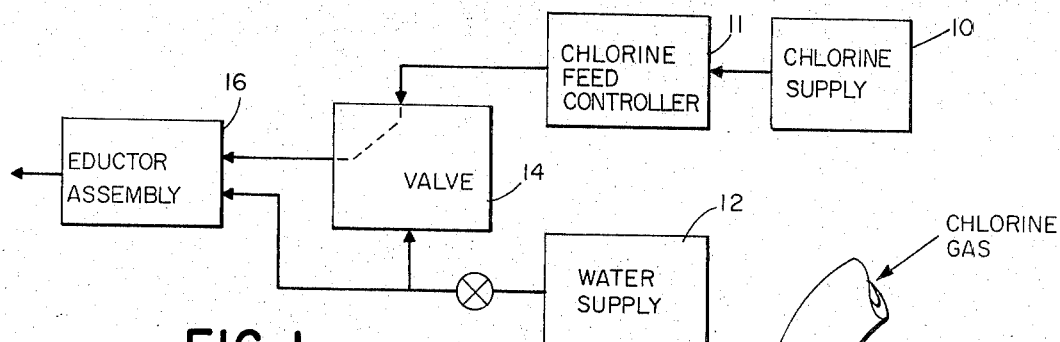
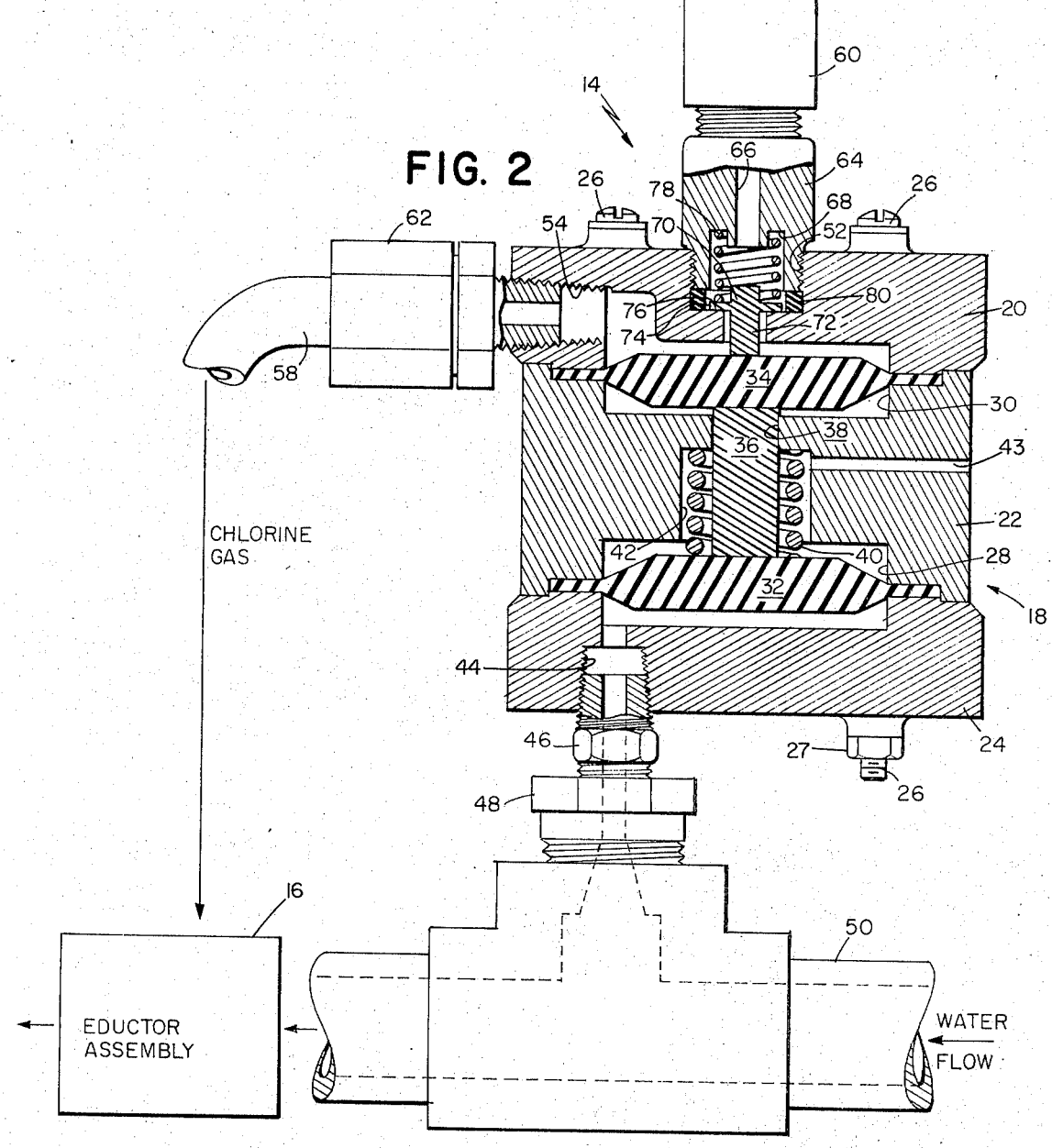

VALVE

BACKGROUND OF THE INVENTION

This invention relates to valves.

A principal object of this invention is to provide a valve which will operate automatically to feed to a valve outlet a first fluid when there is an adequate pressure in a second fluid line and positively shut off the flow of the first fluid when the pressure of the second fluid is either terminated or diminishes below a predetermined value. It is a further object to provide such a valve which is of simple and rugged construction and which is relatively inexpensive to manufacture.

An example of the use of such a valve is in the chlorination of water where it is very desirable to have a positive shut-off of the flow of chlorine gas from a pressurized source should the water pressure be interrupted for any reason.

SUMMARY OF THE INVENTION

In accordance with the invention, a valve for passing a first fluid in response to pressure in a second fluid line comprises a body having first fluid inlet and outlet ports which are connected by an internal fluid passage, a second fluid inlet port, and first and second internal chambers. A first flexible diaphragm is provided in the first internal chamber and is mounted on the body to divide the first chamber into separate first and second portions, the former portion communicating with the inlet port for the second fluid. A second flexible diaphragm is mounted in the second chamber and a movable rigid connector extends between the two diaphragms. Passage sealing means are provided in the internal fluid passage for interrupting or permitting the flow of the first fluid. Those means include structure disposed to engage the second diaphragm, whereby movement of the second diaphragm is operative to open the second fluid passage.

In preferred embodiments of the invention, the passage sealing means comprise a poppet valve having an elongated central body portion which engages the second diaphragm; the diaphragms are made from rubber and are clamped by the body around the entire periphery of each diaphragm; and biasing means are provided which bias the first diaphragm in a direction away from the rigid connector.

DETAILED DESCRIPTION OF THE DRAWING

Other objects, features and advantages of the invention will appear from the following description of a preferred embodiment taken together with the accompanying drawing. In the drawing:

FIG. 1 is a block diagram of a water chlorination system in which a valve constructed according to the invention would be useful; and FIG. 2 is a longitudinal sectional view of a valve constructed according to the invention.

DETAILED DESCRIPTION OF A PREFERRED EMBODIMENT

Referring to the chlorination system depicted in FIG. 1, the chlorine supply 10 is typically a cylinder of pressurized chlorine gas having valve means (e.g., chlorine feed controller 11) at the cylinder head. Chlorine and water from a water supply 12 enter the valve 14 in separate inlets. The water passes directly to an eductor device 16 and, in response to the pressure experienced in valve 14 at the water inlet port, chlorine is passed by valve 14 to the eductor 16 for mixture with the water in a conventional fashion.

Referring to the detailed view of FIG. 2, the valve 14 includes a body portion 18 which is made up of upper, middle, and lower members 20, 22 and 24, respectively, which are securely held in a leak-proof, stacked arrangement by bolts 26 and nuts 27. Opposed relieved areas in the three members 20, 22, 24 provide lower and upper internal chambers 28, 30 in the body 18.

Thick, circular, rubber diaphragms 32, 34 are disposed in chambers 28, 30, respectively, and each is tightly clamped, to form a leak-proof seal, between the respective pair of adjacent portions of the body 18. A rigid connector rod 36 is slidably disposed in a channel 38 which connects chambers 28 and 30 and is in contact at its opposite ends with diaphragms 32 and 34, respectively. A spring 40 is disposed in a wider central channel 42 and biases diaphragm 32 in a downward direction as viewed in FIG. 2. A vent 43 connects channel 42 with the exterior of valve 14.

The lower body member 24 has a water inlet port 44 which communicates, via nipple 46 and fitting 48, with the channel 50 which conducts water from the water source to the eductor (see FIG. 1). The upper body member 20 includes chlorine inlet and outlet ports 52 and 54, respectively. Chlorine inlet and outlet tubes 56, 58 are coupled to the inlet and outlet ports by conventional fittings 60 and 62, respectively. A valve fitting 64 is disposed between fitting 60 and inlet port 52. Fitting 64 has a central channel 66 and an internal annular recess 68. The poppet valve member 70 is aligned with channel 66 and fitting 64 and includes a central body 72 and an annular flange 74. The flange 74 cooperates with a shoulder 76 provided in upper body member 20 to seal the inlet port 52. The central body 72 projects downwardly and extends into internal chamber 30 for contact with diaphragm 34. Biasing spring 78 is disposed between flange 74 and groove 68. A seal member 80 is disposed between shoulder 76 and the annular lower surface of fitting 64.

In operation, diaphragms 32 and 34 are mechanically linked by rigid connector 36 and diaphragm 34 is further disposed such that upward flexing, in response to upward pressure from connector 36, can cause upward movement of the poppet valve 70 against the influence of biasing spring 78.

With an adequate water pressure in channel 50, the water fills the lower or "first" portion of chamber 28 below the diaphragm 32 and its pressure forces the diaphragm to flex upward against the biasing force of spring 40. This motion is transmitted to diaphragm 34 by means of the connector 36. Upward motion of diaphragm 34, as already explained, forces the valve member 70 upward and opens the passage (consisting of inlet port 52, the upper portion of internal chamber 30 above diaphragm 34, and outlet port 54) for the flow of chlorine gas from inlet tube 56 through the valve 14 to outlet tube 58. Should the water pressure be interrupted (or fall below a value selectable by varying the force of spring 40 through spring changes or shimming) the springs 40 and 78 return diaphragm 32, connector 36, diaphragm 34, and valve member 70 to a lower (as viewed in FIG. 2) position in which the flange 74 of valve 70 is seated on shoulder 76, thereby positively shutting off the flow of chlorine gas through the valve 14.

While a particular preferred embodiment has been described in detail, other embodiments are within the scope of the present invention and the appended claims.

I claim:
1. A system for mixing separate fluids comprising
an eductor assembly and a valve for passing a first fluid through a first fluid line to said assembly in response to pressure in a second fluid line, said second line being directly connected to said assembly, said valve comprising a body having first fluid inlet and outlet ports connected by an internal fluid passage, a second fluid inlet port connected to said second line and first and second internal chambers, a first flexible diaphragm mounted on said body and dividing said first chamber into separate first and second portions, said first portion communicating with said second fluid inlet port, a second flexible diaphragm mounted on said body and in said second chamber, a free floating rigid connector extending between said diaphragms, a vent passage connecting the space between said diaphragms with the exterior of the valve, passage sealing means in said internal fluid passage including structure disposed to engage said second diaphragm, whereby movement of said second diaphragm is operative to open said passage, biasing means which bias said first flexible diaphragm in a direction away from said rigid connector, each said diaphragm comprising a unitary rubber disc having a thick central portion and a thinner peripheral portion, each disc being clamped by said body around the entire peripheral portion of the disc.

* * * * *